United States Patent
Wada

(10) Patent No.: US 6,812,931 B2
(45) Date of Patent: Nov. 2, 2004

(54) RENDERING PROCESS

(75) Inventor: Shinya Wada, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 38 days.

(21) Appl. No.: 10/191,665

(22) Filed: Jul. 9, 2002

(65) Prior Publication Data

US 2003/0011611 A1 Jan. 16, 2003

(30) Foreign Application Priority Data

Jul. 13, 2001 (JP) .......................................... 2001-213761
Feb. 5, 2002 (JP) .......................................... 2002-028750

(51) Int. Cl.$^7$ ................................................. G09G 5/00
(52) U.S. Cl. ......................................... 345/582; 345/601
(58) Field of Search ....................... 345/552, 582–588, 345/FOR 211; 348/128

(56) References Cited

U.S. PATENT DOCUMENTS 5,812,141 A * 9/1998 Kamen et al. ............... 345/587
2002/0101419 A1 * 8/2002 Cook ........................... 345/426

FOREIGN PATENT DOCUMENTS

| JP | 1131976 A | 5/1989 |
| JP | 8077368 A | 3/1996 |
| JP | 10208067 A | 8/1998 |
| JP | 2001084391 A | 3/2001 |
| JP | 2001160151 A | 6/2001 |

* cited by examiner

Primary Examiner—Matthew C. Bella
Assistant Examiner—G. F. Cunningham
(74) Attorney, Agent, or Firm—Lerner, David, Littenberg, Krumholz & Mentlik, LLP

(57) ABSTRACT

A rendering processing device acquires a shift value for shifting a texel coordinate value generated from the apex coordinate values of a polygon, corrects the texel coordinate value using the shift value, acquires color information from a texture table based on the corrected texel coordinate value, and then assigns the color information to the polygon. The rendering processing device thus can move patterns or the like on the surface of the polygon without moving the polygon per se.

16 Claims, 4 Drawing Sheets

RENDERING PROCESS

CROSS-REFERENCE TO RELATED APPLICATIONS

This application claims priority from Japanese Patent Application No. 2001-213761 filed on Jul. 13, 2001, and No. 2002-28750 filed on Feb. 5, 2002, the disclosures of which are hereby incorporated by reference herein.

BACKGROUND OF THE INVENTION

The present invention relates to a rendering process for displaying three-dimensional images on a two-dimensional screen, such as on a television monitor, a device used therefor, a recording medium having recorded thereon a rendering process program and such rendering process program.

There are accelerating trends in higher integration and faster processing speed of processors and memories in recent television game console machines and personal computers, so that a rendering processing device composed of such game console machine or personal computer can generate fine, high-definition, diversified two-dimensional images with real presence in a real-time manner, and can display them on two-dimensional monitor screens.

When a three-dimensional image is rendered on a two-dimensional monitor screen, the three-dimensional polygon data are subjected to various geometric processes such as coordinate conversion, clipping and lighting, and the resultant data are further subjected to transparent projection conversion. The rendering processing device pastes textures having various colors and patterns onto polygons to thereby give desired colors and patterns to the objects. Such pasting of textures onto polygons is generally referred to as texture mapping.

In texture mapping, the rendering processing device first sets texture coordinate values corresponding to the apexes of a polygon, and generates texel coordinate values corresponding to the individual pixels within the polygon by a linear interpolation operation, referred to as a so-called DDA (digital differential analysis). From the texel coordinate values, the rendering processing device then determines address values used for making reference to texel colors, based on which texel colors of the texture stored in a texture buffer are referred to. The rendering processing device then pastes the referenced texel colors to the individual pixels within the polygon to thereby complete the texture mapping.

As described in the above, the conventional rendering processing device generates the texel coordinate values (i.e., texel color reference addresses) based on the individual apexes of the polygon, so that the individual texel coordinate values within the polygon cannot directly be adjusted.

SUMMARY OF THE INVENTION

The present invention was proposed to address the foregoing problems, and an object thereof resides in providing a rendering process capable of adjusting the individual texel coordinate values on the surface of a polygon, that is, moving patterns or the like on the surface of a polygon without moving such polygon per se, a device used therefor, a recording medium having recorded thereon a rendering process program and such rendering process program.

In the present invention, a shift value for shifting a texel coordinate value generated from apex coordinate values of a polygon is acquired, and such shift value is then used for correcting the texel coordinate value generated from the apex coordinate values of the polygon. The corrected texel coordinate value is then used for obtaining color information from a texture table in which the individual pixels express at least color information, and the color information is assigned to the polygon.

In other words, the present invention allows the individual texel values to be adjusted respectively by correcting the texel coordinate value generated from the apex coordinate values of the polygon using the shift value. The present invention also allows patterns or the like within the polygon to be altered or moved without moving such polygon per se (i.e., without altering the apex coordinate values of the polygon) by acquiring color information from a general texture table based on such corrected texel coordinate value.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION

Figure 1:
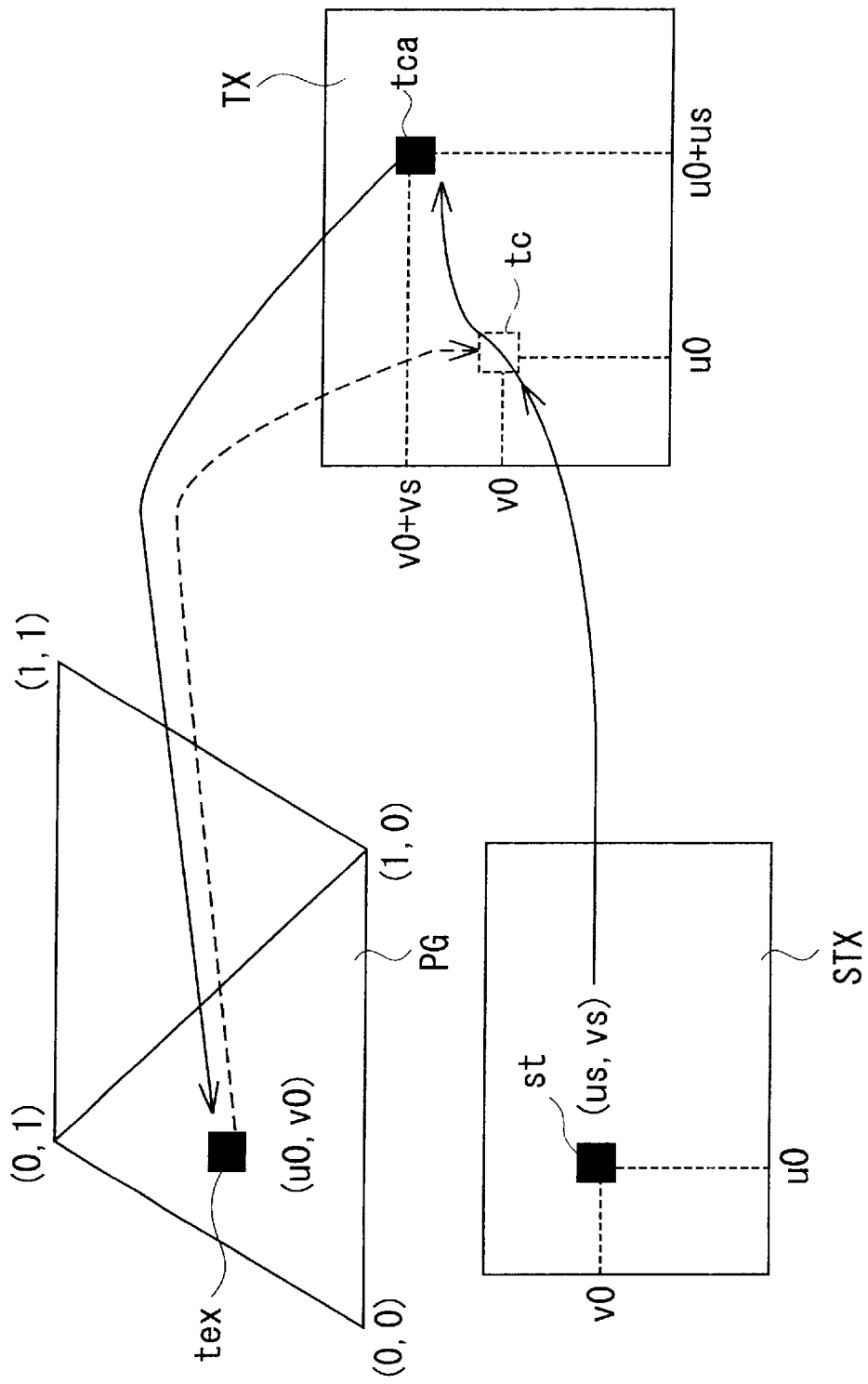
FIG. 1 is a drawing for explaining texture mapping associated with the shift of a texture coordinate.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

An outline of texture mapping according to the present invention will be explained referring to FIG. 1.

The rendering processing device of the present embodiment is provided with a texture buffer which stores a variety of textures to be pasted on the surface of polygons. Each texel in a texture has three primary colors of R (red), G (green) and B (blue), and a so-called alpha ($\alpha$) value for expressing semi-transparency used for image synthesis.

As shown in FIG. 1, the rendering processing device of the present embodiment is also provided with a texture table STX comprising two-dimensional coordinate values which are used for correcting texel coordinate values calculated from texture coordinates corresponding to the apexes of polygons. In other words, the two-dimensional coordinate values in the table STX represent the amount of shift for shifting the texel coordinates.

The rendering processing device of the present embodiment implements texture mapping by first setting, as shown in FIG. 1, a texture coordinate value corresponding to each of the apexes of the polygon PG, and then generating a texel coordinate value tex corresponding to each pixel within such polygon PG by DDA calculation. The rendering processing device then determines a texel color reference address tc based on the texel coordinate value tex.

The texel color reference address is now used as an address for making reference to the table STX as required. For example, when it is requested that only a pattern on the surface of such polygon be altered without altering the apex coordinates of such polygon, the rendering processing device will use such reference address as an address for making reference to the table STX. So that in this case, a value referenced from the table STX using the reference address will be a two-dimensional coordinate value st for shifting the texel coordinate value tex. The exemplary case shown in FIG. 1 represents that a two-dimensional coordinate value st (us, vs) is requested from the table STX using a reference address corresponding to a texel coordinate value tex (u0, v0).

The rendering processing device of the present embodiment now determines an address (U, V) for making reference to the texel color of a texture TX within a texture buffer according to the equations (1) and (2) shown below using such two-dimensional coordinate value st (us, vs) and the texel coordinate value tex (u0, v0) previously obtained:

$$U = u0 + us \quad (1)$$

$$V = v0 + vs \quad (2)$$

The rendering processing device then makes reference to a texel color tca of the texture TX from the texture buffer by using the texel color reference address (U, V) obtained from the equations (1) and (2) so that a color to be assigned to the texel coordinate value tex (u0, v0) of the polygon PG will be a color corresponding to the address (U, V). More specifically, the rendering processing device makes reference to the texel color tca from the texture TX based on the texel coordinate value (u0+us, v0+vs) which was obtained by correcting the texel coordinate value tex (u0, v0) using the two-dimensional coordinate value st (us, vs) in the table STX. It is also possible for the rendering processing device to calculate the texel color reference address (U, V) by processing the two-dimensional coordinate value st (us, vs) through subtraction, multiplication, division or the like with a predetermined value. The rendering processing device may also calculate the texel color reference address (U, V) by processing the two-dimensional coordinate value st (us, vs) through subtraction, multiplication, division or the like with a predetermined value, and by further processing the texel coordinate value tex (u0, v0) through subtraction, multiplication, division or the like with the thus obtained two-dimensional coordinate value.

As described in the above, the rendering processing device of the present embodiment uses, as required, each texel coordinate value obtained by DDA as a reference address for the table STX to thereby make reference to a two-dimensional value st in the table STX, and uses such value st as a reference address for the texture TX in the texture buffer. This allows the rendering processing device to implement rendering such that a pattern on a polygon can be altered without changing the apex coordinates of the polygon.

The two-dimensional coordinate value st in the table STX may be a value for shifting the texel coordinate value tex in either direction along the "u" axis or "v" axis in the u-v coordinate system.

The table STX may be such as to consist of two-dimensional coordinate values capable of individually making reference to the two-dimensionally-aligned texels on the texture TX typically in a spiral, latticewise, or checkerwise manner. In this case, the rendering processing device can paste on the polygon a pattern obtained by modifying the original pattern of the texture TX in a spiral, latticewise or checkerwise manner.

The table STX may also be such as to consist of two-dimensional coordinate values capable of exchanging the left and right of the individual texel coordinate values tex obtained by DDA. In this case, the rendering processing device can paste on the polygon the mirror image of the polygon. Of course, the table STX may be such as to consist of two-dimensional coordinate values capable of exchanging the top and bottom of the individual texel coordinate values tex obtained by DDA, the left and right and top and bottom thereof, or the diagonals thereof.

The rendering processing device of the present embodiment can also move the pattern on the polygon by using a plurality of tables having two-dimensional coordinate values slightly displaced from one another, where the individual tables for making reference to the individual texel coordinate values tex are successively changed at predetermined time intervals, and the two-dimensional coordinate values obtained at predetermined time intervals are then used for making reference to the texel colors from the texture TX, which colors are successively pasted on the polygon.

The table STX may be provided as a separate texture besides the general texture TX to be pasted on the polygon. In other words, a texture in which each texel value comprises a two-dimensional coordinate value for shifting the texel coordinate value can be used as the foregoing table STX. For the case that the texture is used as the table STX, the two-dimensional coordinate value is expressed using any one of the R, G, B and a values. Of course, the two-dimensional value may be expressed using all of such values or any combinations thereof. By using the texture as the table STX as described above, it is not necessary for the rendering processing device to use specific data for the table STX, which allows use of data equivalent to those for the general texture TX. It is also not necessary to provide a dedicated memory for storing the table STX, and a dedicated constitution or process for handling such table STX.

The shift value for shifting the texel coordinate value tex as described above may also be generated by calculation. More specifically, the rendering processing device can implement the process in the same manner as the case the table STX was used, by generating, through calculations using the internal CPU, the shift value (Su, Sv) for correcting the texel coordinate value tex obtained by DDA, and shifting the texel coordinate value tex by calculations in which the obtained shift value (Su, Sv) is substituted for (us, vs) in the equations (1) and (2). The rendering processing device may still also shift the texel coordinate value tex by processing such texel coordinate value tex through subtraction, multiplication, division or the like with the shift value (Su, Sv).

An advantage of this case resides in that the internal CPU can arbitrarily set the shift value (Su, Sv). This enables a texture on a polygon to be moved in a two-dimensional manner through a control by which the texel coordinate values tex are successively subjected to texture mapping so as to be shifted by a shift amount (Su, Sv) for every predetermined time period.

Of course, the texel coordinate value tex may be shifted in either direction along the "u" axis or "v" axis in the u-v coordinate system. More specifically, the rendering processing device can freely move the pattern on the polygon through a control by which the texel coordinate value is first shifted in the direction of the "u" axis by a shift amount of "Su" for every predetermined time period and then subjected to texture mapping.

Exemplary Constitution

Figure 2:
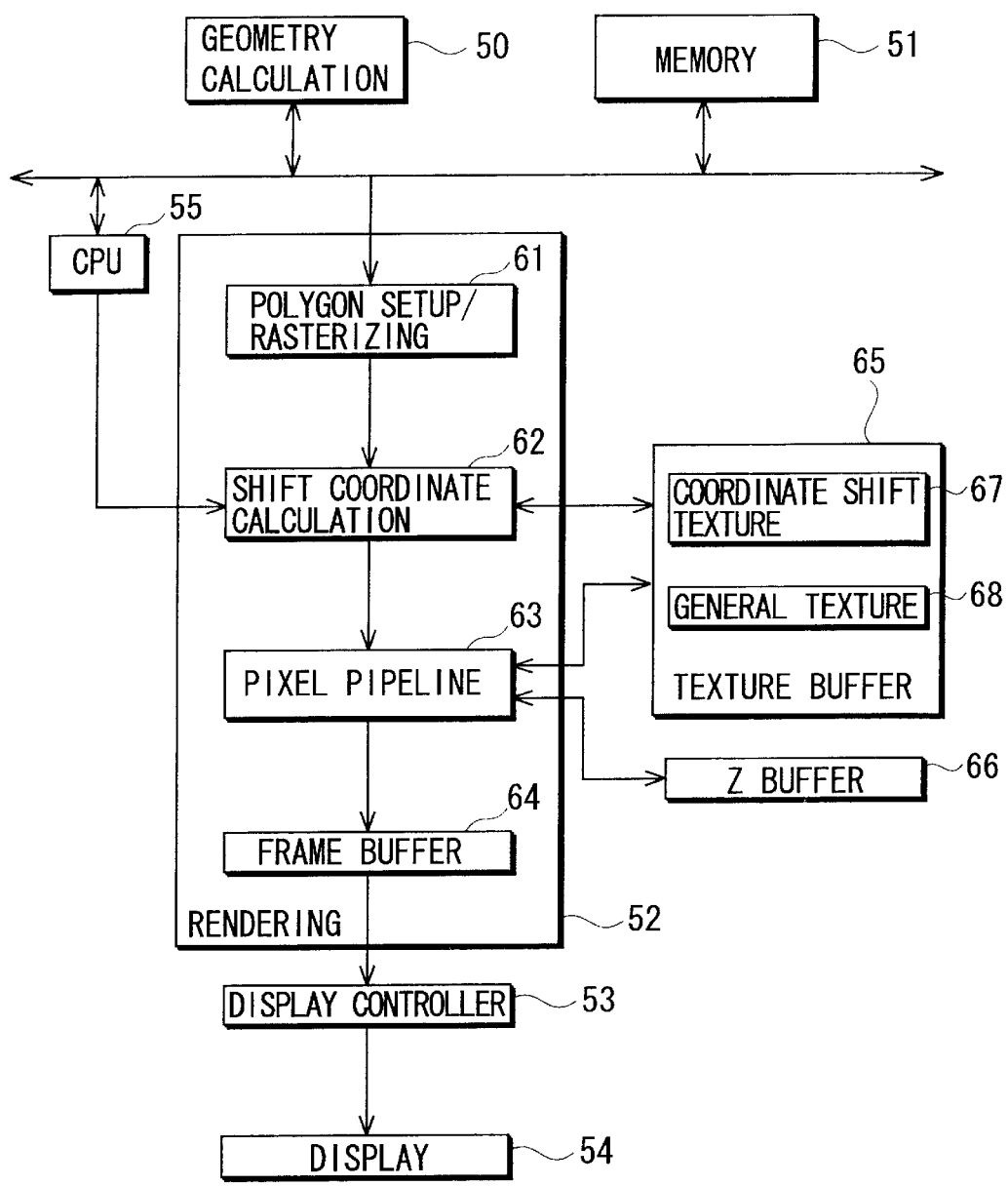
FIG. 2 is a block diagram showing an exemplary device constitution for implementing a rendering process including texture mapping associated with the shift of a texture coordinate.

FIG. 2 shows an exemplary specific constitution of the rendering processing device responsible for the foregoing texture mapping. The constitution shown in FIG. 2 is one example by which the rendering process of the present embodiment is carried out by hardware such as a digital signal processor (DSP) or a graphic processor (GP). The individual components shown in FIG. 2 correspond to the individual internal processing units of such DSP or GP. The following description will deal with the case in which the texture is used as the table STX. It is to be noted that the texture used as the table STX will specifically be denoted as "coordinate shift texture" in order to discriminate it from the general texture TX.

As shown in FIG. 2, a memory 51 stores graphic information such as polygons (apex information or apex-linked information such as coordinate values for apexes, RGB apex color values, map coordinate values and vector values). The graphic information herein is previously captured by being read out from various recording media such as a CD-ROM, DVD-ROM or semiconductor memory, or by being downloaded through communication or transmission media based on line or radio communication.

A CPU 55 controls operations of the individual units based on a control program.

A geometry calculation unit 50 retrieves stored graphic information from the memory 51, and then subjects the retrieved graphic information to so-called affine transformation, projection conversion onto a screen coordinate, and light source processing for the apexes. The graphic information after the projection conversion (polygon data) is sent to a rendering unit 52.

The rendering unit 52 is responsible for calculation for displaying polygons on the screen, and converts polygon data sent from the geometry calculation unit 50 into pixels. The rendering unit 52 can roughly be divided into a polygon setup/rasterizing unit 61 (hereinafter, simply abbreviated as PSR unit 61), a shift coordinate calculation unit 62 (hereinafter, simply abbreviated as SCC unit 62), a pixel pipeline unit 63 and a frame buffer 64.

The rendering unit 52 is provided with a texture buffer 65 and a Z buffer 66. The texture buffer 65 stores the general texture 68 (the above-mentioned texture TX) and the coordinate shift texture 67 (the above-mentioned coordinate shift texture) comprising two-dimensional coordinate values st by which the individual texels can shift the texel coordinate values tex. The Z buffer 66 stores Z values which express the depth-wise distance of an image from a viewpoint. Such general texture 68, coordinate shift texture 67 and Z values herein are previously captured by being read out from various recording media such as a CD-ROM, DVD-ROM or semiconductor memory, or by being downloaded through communication or transmission media based on line or radio communication.

The PSR unit 61 is responsible for retrieving and buffering polygon data sent from the geometry calculation unit 50, and is also responsible for pixel generation through rasterizing, and calculation of texel coordinate values tex. Pixel data and texel coordinate values are sent to the SCC unit 62.

The SCC unit 62 generates a reference address based on the texel coordinate value tex received from the PSR unit 61.

Assuming now that a coordinate shift instruction signal corresponding to a request for moving only the pattern on the surface of the polygon without altering the apex coordinates thereof was fed from the CPU 55, the SCC unit 62 generates an address for making reference to the coordinate shift texture 67 based on the texel coordinate value tex received from the PSR unit 61. The SCC unit 62 then makes reference to the two-dimensional coordinate value st from the coordinate shift texture 67 in the texture buffer 65 using such generated address.

The SCC unit 62 determines a texel color reference address (U, V) by calculation based on the equations (1) and (2) using the two-dimensional coordinate value st and texel coordinate value tex received from the PSR unit 61. The obtained address (U, V) is then sent together with the pixel data to the pixel pipeline unit 63.

It is to be noted now that the coordinate shift instruction signal is a signal generated by CPU 55 according to the control program when the rendering process will be implemented so as to move only a pattern on the surface of a polygon without altering the apex coordinates of such polygon. When such coordinate shift instruction signal is not supplied from the CPU 55, that is, when the rendering process to alter only a pattern on the surface of the polygon without altering the apex coordinates of the polygon will not be implemented, the SCC unit 62 does not generate the reference address for the coordinate shift texture 67, and only generates an address for making reference to the general texture 68 instead.

The pixel pipeline unit 63 implements the texture mapping while making reference to the texel color in the general texture 68 from the texture buffer 65 using the address (U, V) received from the SCC unit 62, and taking Z values stored in the Z buffer 66 into consideration. Pixel data after the texture mapping output from the pixel pipeline unit 63 is sent to the frame buffer 64.

The frame buffer 64 has a memory space corresponding to a display (screen) 54, such as a television monitor, in which memory space color values for the individual pixels are written. The screen data generated in the memory space are read out by frame units as requested by a display controller 53.

The display controller 53 generates horizontal synchronizing signals and vertical synchronizing signals of the television monitor, and also serially retrieves pixel data from the frame buffer 64 in a line-feed manner in synchronization with the display timing of the monitor. The serially-retrieved, line-fed color values compose a two-dimensional image which will be displayed on the display 54.

It is to be noted that for the case in which the foregoing shift value (Su, Sv) will be generated by calculation without using the table STX, the rendering processing device shown in FIG. 2 need not have the coordinate shift texture 67, and the CPU 55 will be responsible for the generation of such shift value (Su, Sv). The SCC unit 62 will then determine the address (U, V) for making reference to texel color by shifting the texel coordinate value tex using such shift value (Su, Sv). The pixel pipeline unit 63 will then make reference to the texel color of the general texture 68 using the address (U, V) received from the SCC unit 62.

Other Example

The rendering process of the present embodiment is, of course, also achievable on a software basis (application programs for computer).

Figure 3:
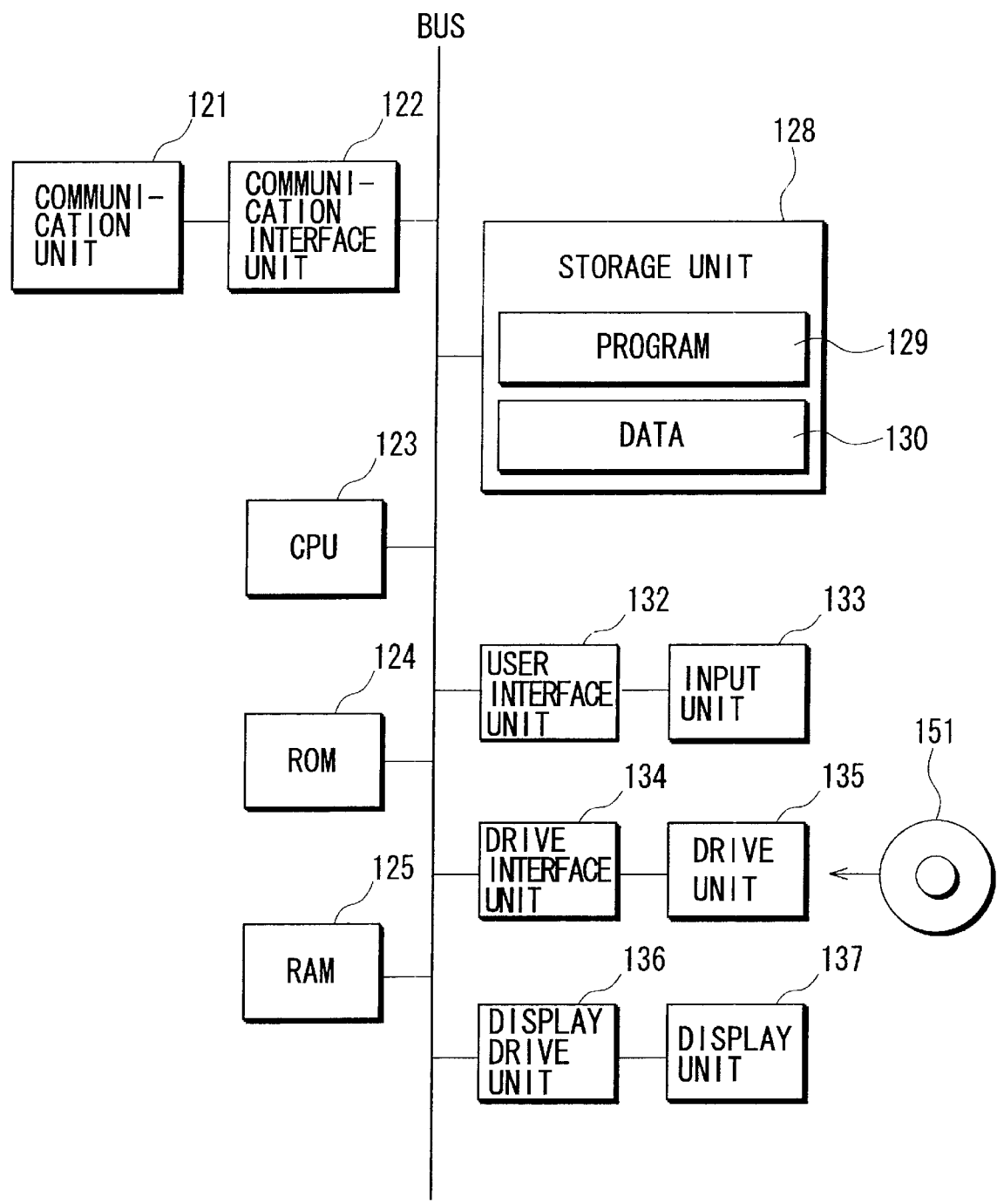
FIG. 3 is a block diagram showing the schematic constitution of a computer implementing the rendering process.
Figure 4:
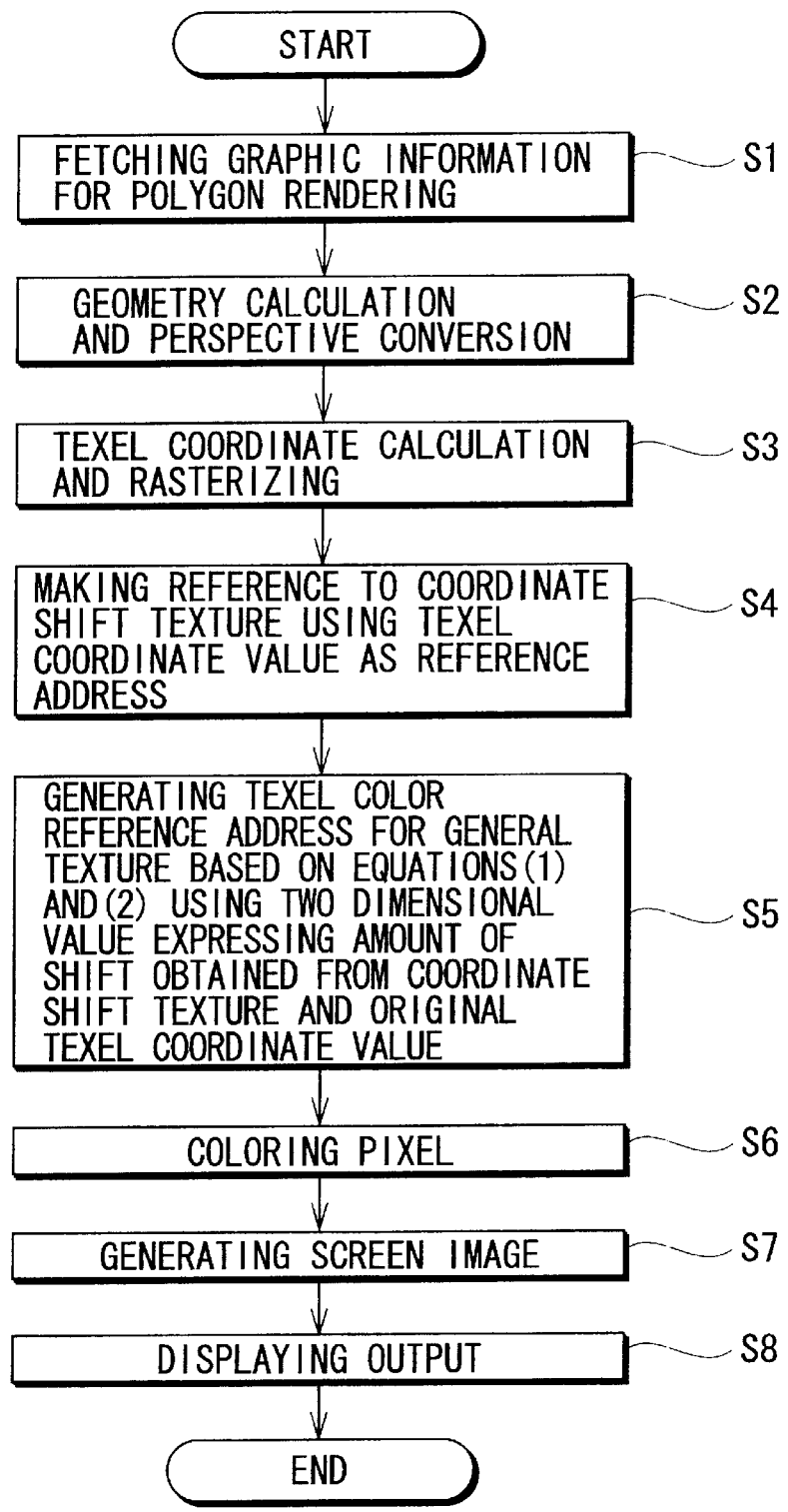
FIG. 4 is a flow chart of a computer-executed texture mapping process associated with the shift of a texture coordinate.

FIGS. 3 and 4 show the constitution and operation of a computer on which the rendering process of the present embodiment is implemented. FIG. 3 shows an exemplary constitution of the principal portion of the computer. FIG. 4 shows a process flow according to which a CPU 123 of the computer shown in FIG. 3 executes the rendering process program of the present invention. Now the following description deals with a case in which a texture is used as a table STX.

In FIG. 3, a storage unit 128 typically comprises a hard disk and a drive therefor. Such storage unit 128 has stored therein an operating system program, a computer program 129 including the rendering process program of the present embodiment read out from various recoding media, such as a CD-ROM or DVD-ROM, or downloaded through a communication line, and a variety of data 130 such as graphic information for polygon rendering, general texture TX, coordinate shift texture and Z values.

A communication unit 121 refers to a communication device responsible for data communication with external devices, which may be a modem for establishing connection to an analog public telephone line, a cable modem for establishing connection to a cable television network, a terminal adaptor for establishing connection to an ISDN (integrated services digital network), and a modem for establishing connection to an ADSL (asymmetric digital subscriber line). A communication interface (I/F) unit 122 refers to an interface device responsible for protocol transfer for enabling send/receive of data between the communication unit 121 and an internal bus (BUS).

An input unit 133 refers to an input device such as a keyboard, mouse or touch pad, and a user interface (I/F) unit 132 refers to an interface device for supplying signals from such input unit 133 to the internal devices.

A drive unit 135 refers to a drive device capable of reading out various data or programs from a recording medium, including a disk medium 151 such as a CD-ROM, DVD-ROM or floppy (trade mark) disk, or from a card-type or other type of semiconductor memory. A drive interface (I/F) unit 134 refers to an interface device for supplying signals from such drive unit 135 to the internal devices.

A display unit 137 refers to a display device, such as a CRT (cathode ray tube) or liquid crystal display, and a display drive unit 136 is a device for driving such display unit 137.

The CPU 123 controls the entire operation of the personal computer based on the operating system program stored in the storage unit 128 or the computer program 129 of the present embodiment.

A ROM 124 typically comprises a rewritable non-volatile memory, such as a flash memory, and stores a BIOS (basic input/output system) and various default values of the personal computer. A RAM 125 will have loaded therein application programs and various data read out from a hard disk of the storage unit 128, and is used as a work RAM of the CPU 123.

In the constitution shown in FIG. 3, the CPU 123 can accomplish the image processing as described above by executing the rendering process program of the present embodiment which is read out from the storage unit 128 and loaded into the RAM 125.

Next, the process flow which occurs when the CPU 123 of the computer shown in FIG. 3 operates based on the rendering process program of the present embodiment will be explained with reference to FIG. 4.

In step S1 shown in FIG. 4, the CPU 123 retrieves from the storage unit 128 graphic information for polygon rendering, general texture TX, coordinate shift texture and Z values preliminarily stored therein as data 130, and allows the RAM 125 to hold them.

The CPU 123 then, in step S2, retrieves the graphic information held by the RAM 125, and subjects the graphic information to geometry calculation and perspective conversion such as affine conversion, projection conversion onto a screen coordinate, and light source processing for the apexes.

The CPU 123 then, in step S3, performs rasterizing and calculation of texel coordinate value tex using polygon data obtained by the geometric calculation.

In a rendering process whereby only a pattern on the surface of the polygon is moved without altering coordinate values for the polygon apexes, the CPU 123, in step S4, generates an address for making reference to the coordinate shift texture based on the texel coordinate value tex. The CPU 123 then uses the obtained address to find a two-dimensional coordinate value st for shifting a texel coordinate from the coordinate shift texture developed on the RAM 124.

The CPU 123 then, in step S5, calculates a texel color reference address (U, V) for the general texture TX through calculations based on the foregoing equations (1) and (2) using the two-dimensional coordinate value st expressing the amount of shifting of the texel coordinate, and the previously obtained texel coordinate value tex.

The CPU 123 then, in step S6, performs texture mapping using the obtained address (U, V), while making reference to texel colors of the general texture TX stored in the RAM 125, and considering Z values.

The CPU 123 then, in step S7, generates a screen image from the pixel data after the texture mapping, and, in step S8, sends information on such screen image to the display drive 136. An image will thus appear on the display unit 137.

Now for the case that the foregoing shift value (Su, Sv) is to be generated by calculation without using the table STX, the CPU 123 of the rendering processing device shown in FIG. 3 will be responsible for generating such shift value (Su, Sv). The CPU 123 then finds a texel color reference address (U, V) by shifting the texel coordinate value tex using the shift value (Su, Sv), and makes reference to the texel color of the general texture TX using such address (U, V).

As has been described in the above, the rendering processing device of the present embodiment shown in FIG. 2 or FIG. 3 uses each texel coordinate value tex obtained from the texture coordinate as a reference address for the coordinate shift texture as required, and obtains a two-dimensional coordinate value st using such reference address in order to make reference to such coordinate shift texture. The rendering processing device then makes reference to texel color from the normal texture based on the two-dimensional coordinate value st and on the address (U, V) generated from the texel coordinate value tex. This successfully attains a rendering in which the individual texel coordinate values within a polygon can be adjusted without altering coordinate values for the polygon apexes, to thereby alter only the pattern on the surface of the polygon.

The rendering processing device shown in FIG. 2 or FIG. 3 uses the coordinate shift texture as the table STX so that there is no need to preliminarily obtain specific data as such table STX, and those for the general texture will suffice. The rendering processing device of the present embodiment is also advantageous in that it enables shifting of texel coordinate values without increasing the process load in the rendering unit or CPU.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. For example, the rendering process of the present embodiment is applicable not only to a specialized video game machine or personal computer, but also to various information processing devices including a handy phone terminal.

What is claimed is:

1. A rendering process, comprising:
   obtaining texel coordinate values corresponding to apexes of a polygon and to other locations of the polygon generated from apex coordinates of the polygon;
   acquiring a shift value for shifting a specific texel coordinate value of the obtained texel coordinate values;
   correcting the specific texel coordinate value using the shift value;
   obtaining color information from a texture table based on the corrected texel coordinate value, the texture table including a plurality of texel coordinates, each texel coordinate including a texel value representing at least color information for a texture; and
   assigning the color information to the polygon.

2. The rendering process according to claim 1, wherein
   the acquiring step generates the shift value; and
   the correcting step corrects the specific texel coordinate value based on a predetermined calculation using the specific texel coordinate value and the shift value.

3. The rendering process according to claim 1, wherein
   the acquiring step acquires the shift value from a shift value table storing a plurality of shift values; and
   the correcting step corrects the specific texel coordinate value based on a predetermined calculation using the specific texel coordinate value and the shift value.

4. The rendering process according to claim 3, wherein
   the shift value table includes a plurality of texel coordinates, each texel coordinate including a texel value representing a shift value for the texel coordinate.

5. The rendering process according to claim 4, wherein
   each shift value is a two-dimensional coordinate value representing texture information selected from the group consisting of color information based on the three primary colors of light, semi-transparency information used for image synthesis, and combinations thereof.

6. A rendering processing device, comprising:
   a texture table including a plurality of texel coordinates, each texel coordinate including a texel value representing at least color information for a texture;
   an acquisition unit operable to acquire a shift value for shifting a specific texel coordinate value corresponding to at least one location selected from apexes of a polygon and other locations generated from apex coordinates of the polygon;
   a correction unit operable to correct the specific texel coordinate value using the shift value; and
   an assignment unit operable to obtain color information from the texture table based on the corrected texel coordinate value and to assign the color information to the polygon.

7. The rendering processing device according to claim 6, wherein
   the acquisition unit is operable to generate the shift value; and
   the correction unit is operable to correct the specific texel coordinate value based on a predetermined calculation using the specific texel coordinate value and the shift value.

8. The rendering processing device according to claim 6, wherein
   the acquisition unit includes a shift value table storing a plurality of shift values, and is operable to acquire the shift value from the shift value table; and
   the correction unit is operable to correct the specific texel coordinate value based on a predetermined calculation using the specific texel coordinate value and the shift value.

9. The rendering processing device according to claim 8, wherein
   the shift value table includes a plurality of texel coordinates, each texel coordinate including a texel value representing a shift value for the texel coordinate.

10. The rendering processing device according to claim 9, wherein
    each shift value is a two-dimensional coordinate value representing texture information selected from the group consisting of color information based on the three primary colors of light, semi-transparency information used for image synthesis, and combinations thereof.

11. A computer-readable recording medium having recorded thereon a rendering process program, the rendering process program comprising:
    obtaining texel coordinate values corresponding to apexes of a polygon and to other locations of the polygon generated from apex coordinates of the polygon;
    acquiring a shift value for shifting a specific texel coordinate value of the obtained texel coordinate values;
    correcting the specific texel coordinate value using the shift value;
    obtaining color information from a texture table based on the corrected texel coordinate value, the texture table including a plurality of texel coordinates, each texel coordinate including a texel value representing at least color information for a texture; and
    assigning the color information to the polygon.

12. The computer-readable recording medium according to claim 11, wherein
    the acquiring step of the rendering process program generates the shift value; and
    the correcting step of the rendering process program corrects the specific texel coordinate value based on a predetermined calculation using the specific texel coordinate value and the shift value.

13. The computer-readable recording medium according to claim 11, wherein
    the acquiring step of the rendering process program acquires the shift value from a shift value table storing a plurality of shift values; and
    the correcting step of the rendering process program corrects the specific texel coordinate value based on a predetermined calculation using the specific texel coordinate value and the shift value.

14. The computer-readable recording medium according to claim 13, wherein
    the shift value table includes a plurality of texel coordinates, each texel coordinate including a texel value representing a shift value for the texel coordinate.

15. The computer-readable recording medium according to claim 14, wherein each shift value is a two-dimensional coordinate value representing texture information selected from the group consisting of color information based on the three primary colors of light, semi-transparency information used for image synthesis, and combinations thereof.

16. A rendering process system, comprising:

a processor operable to execute instructions; and instructions, the instructions including:

obtaining texel coordinates values corresponding to apexes of a polygon and to other locations of the polygon generated from apex coordinate of the polygon;

acquiring a shift value for shifting a specific texel coordinate value of the obtained texel coordinate values correcting the specific texel coordinate value using the shift value;

obtaining color information from a texture table based on the corrected texel coordinate value, the texture table including a plurality of texel coordinates, each texel coordinate including a texel value representing at least color information for a texture; and assigning the color information to the polygon.

* * * * *

UNITED STATES PATENT AND TRADEMARK OFFICE
CERTIFICATE OF CORRECTION

PATENT NO. : 6,812,931 B2
DATED : November 2, 2004
INVENTOR(S) : Shinya Wada

It is certified that error appears in the above-identified patent and that said Letters Patent is hereby corrected as shown below:

Column 4,
Line 33, "a" should read -- α --.

Column 11,
Line 12, "coordinate" should read -- coordinates --.

Column 12,
Line 2, after "values" insert -- ; --.

Signed and Sealed this

Fifteenth Day of February, 2005

JON W. DUDAS
*Director of the United States Patent and Trademark Office*